(12) United States Patent
Kestler et al.

(10) Patent No.: US 11,869,472 B2
(45) Date of Patent: Jan. 9, 2024

(54) ACOUSTIC PANEL WITH RECONFIGURABLE CHAMBER CONSTRICTIONS

(71) Applicant: Rohr, Inc., Chula Vista, CA (US)

(72) Inventors: Steven M. Kestler, San Diego, CA (US); Jennifer Davis, La Jolla, CA (US); Jose S. Alonso-Miralles, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 54 days.

(21) Appl. No.: 17/391,750

(22) Filed: Aug. 2, 2021

(65) Prior Publication Data

US 2023/0031186 A1 Feb. 2, 2023

(51) Int. Cl.
*G10K 11/168* (2006.01)
*G10K 11/172* (2006.01)

(52) U.S. Cl.
CPC .......... *G10K 11/168* (2013.01); *G10K 11/172* (2013.01)

(58) Field of Classification Search
CPC .... G10K 11/172; G10K 11/168; F02K 1/827; B32B 3/12; F02C 7/045; F02C 7/24; B64D 2033/0206
See application file for complete search history.

(56) References Cited

U.S. PATENT DOCUMENTS

| | | |
|---|---|---|
| 6,274,216 B1 | 8/2001 | Gonidec |
| 6,536,556 B2 | 3/2003 | Porte |
| 7,051,489 B1 | 5/2006 | Swiszcz |
| 7,288,326 B2 * | 10/2007 | Elzey ............... F16F 1/021 428/179 |
| 8,302,733 B2 | 11/2012 | Peiffer |
| 8,408,358 B1 | 4/2013 | Hermiller |
| 8,616,330 B1 | 12/2013 | McKnight |
| 8,727,072 B2 | 5/2014 | Ayle |
| 8,955,643 B2 | 2/2015 | Liu |
| 9,403,338 B2 | 8/2016 | Tuczek |

(Continued)

FOREIGN PATENT DOCUMENTS

| | | |
|---|---|---|
| CN | 104175616 B | 6/2016 |
| CN | 104723616 B | 7/2016 |

(Continued)

OTHER PUBLICATIONS

Ze et al. "Magnetic Shape Memory Polymers with Integrated Multifunctional Shape Manipulations", https://arxiv.org/ftp/arxiv/papers/1909/1909.13171.pdf, Sep. 2019.

(Continued)

*Primary Examiner* — Jeremy A Luks
(74) *Attorney, Agent, or Firm* — Getz Balich LLC

(57) ABSTRACT

An acoustic panel system is provided that includes a perforated first skin, a second skin and a core. The core is connected to the perforated first skin and the second skin. The core includes a plurality of chambers and a first constriction. Each of the chambers extends vertically through the core between the perforated first skin and the second skin. The chambers include a first chamber. The first constriction is configured to divide the first chamber into a plurality of fluidly coupled sub-chambers. The first constriction is configured from or otherwise includes a shape memory material.

19 Claims, 9 Drawing Sheets

(56) References Cited

U.S. PATENT DOCUMENTS

| | | |
|---|---|---|
| 9,469,985 B1 | 10/2016 | Ichihashi |
| 9,514,734 B1 * | 12/2016 | Jones ................ G10K 11/161 |
| 9,592,918 B2 | 3/2017 | Yu |
| 9,708,930 B2 | 7/2017 | Koroly |
| 9,732,677 B1 | 8/2017 | Chien |
| 9,764,818 B2 | 9/2017 | Nampy |
| 10,332,501 B2 | 6/2019 | Lin |
| 2007/0034447 A1 | 2/2007 | Proscia |
| 2008/0020176 A1 | 1/2008 | Ayle |
| 2008/0020188 A1 | 1/2008 | Gale |
| 2014/0349082 A1 | 11/2014 | Tien |
| 2015/0367953 A1 | 12/2015 | Yu |
| 2017/0028667 A1 | 2/2017 | Fach |
| 2017/0122341 A1 * | 5/2017 | Alonso-Miralles ... F04D 29/522 |
| 2017/0182723 A1 | 6/2017 | Calisch |
| 2017/0225764 A1 | 8/2017 | Nampy |
| 2017/0301334 A1 | 10/2017 | Nampy |
| 2018/0142621 A1 | 5/2018 | Biset |
| 2018/0142622 A1 | 5/2018 | Biset |
| 2019/0063318 A1 | 2/2019 | Roach |
| 2019/0270504 A1 | 9/2019 | Cedar |
| 2020/0003230 A1 | 1/2020 | Alonso-Miralles |
| 2020/0063691 A1 | 2/2020 | Kruckenberg |
| 2020/0309028 A1 | 10/2020 | Murugappan |

FOREIGN PATENT DOCUMENTS

| | | |
|---|---|---|
| EP | 5151535 | 2/2013 |
| EP | 2844463 B1 | 12/2017 |
| GB | 2550926 B | 7/2018 |
| NL | 2021916 B1 | 5/2020 |

OTHER PUBLICATIONS

EP search report for EP22188140.2 dated Dec. 7, 2022.

* cited by examiner

ACOUSTIC PANEL WITH RECONFIGURABLE CHAMBER CONSTRICTIONS

BACKGROUND

1. Technical Field

This disclosure relates generally to sound attenuation and, more particularly, to an acoustic panel.

2. Background Information

An aircraft propulsion system typically includes one or more acoustic panels for attenuating noise generated by a gas turbine engine. These acoustic panels are typically tuned to attenuate noise at a particular gas turbine engine operating state. Therefore, when the gas turbine engine is at another operating state, the acoustic panels may not efficiency and/or effectively attenuate the engine noise. There is a need in the art therefore for an acoustic panel that can attenuate noise across a wide and/or variable spectrum of different gas turbine engine operating states.

SUMMARY OF THE DISCLOSURE

According to an aspect of the present disclosure, an acoustic panel system is provided that includes a perforated first skin, a second skin and a core. The core is connected to the perforated first skin and the second skin. The core includes a plurality of chambers and a first constriction. Each of the chambers extends vertically through the core between the perforated first skin and the second skin. The chambers include a first chamber. The first constriction is configured to divide the first chamber into a plurality of fluidly coupled sub-chambers. The first constriction is configured from or otherwise includes a shape memory material.

According to another aspect of the present disclosure, another acoustic panel system is provided that includes a perforated first skin, a second skin and a core. The core is connected to the perforated first skin and the second skin. The core includes a plurality of chambers and a first constriction. Each of the chambers extends vertically through the core to the perforated first skin and the second skin. The chambers include a first chamber. The first constriction divides the first chamber into a first sub-chamber and a second sub-chamber. The first constriction includes an aperture that fluidly couples the first sub-chamber to the second sub-chamber. The first constriction is actuatable between a first configuration and a second configuration. A size of the aperture when the first constriction is in the first configuration is different than the size of the aperture when the first constriction is in the second configuration.

According to still another aspect of the present disclosure, another acoustic panel system is provided that includes a perforated first skin, a second skin and a core. The core is connected to the perforated first skin and the second skin. The core includes a plurality of chambers and a first constriction. Each of the chambers extends vertically through the core to the perforated first skin and the second skin. The chambers include a first chamber. The first constriction is configured to divide the first chamber into a plurality of fluidly coupled sub-chambers. The first constriction is also configured to deform when subject to a magnetic field.

The first constriction may include a shape memory material configured to deform between the first configuration and the second configuration when subject to an input.

The shape memory material may be configured as or otherwise include a shape memory polymer.

The shape memory material may also include a plurality of magnetic particles embedded within the shape memory polymer.

The shape memory material may be or otherwise include a magnetically actuated shape memory material.

The acoustic panel system may also include an actuator configured to remotely actuate deformation of the first constriction.

The actuator may be configured as or otherwise include an electromagnet.

The first constriction may be configured to deform from a first configuration to a second configuration in response to being subject to a first input.

The first constriction may be configured to deform from the second configuration to the first configuration in response to being subject to a second input.

The first constriction may form an aperture that fluidly couples the fluidly coupled sub-chambers together.

The first constriction may be configured to deform between a first configuration and a second configuration. A size of the aperture when the first constriction is in the first configuration may be different than the size of the aperture when the first constriction is in the second configuration.

The first constriction may include and extend vertically between a first end and a second end. The first end may be attached to a sidewall of the first chamber. The second end may be attached to the sidewall of the first chamber. An intermediate portion of the first constriction vertically between the first end and the second end may be laterally displaceable from the sidewall of the first chamber.

The first constriction may include and extend vertically between a first end and a second end. The first end may be attached to a sidewall of the first chamber. The second end may be laterally displaceable from the sidewall of the first chamber.

The first constriction may be arranged at a vertical end of the first chamber.

The first constriction may be arranged intermediately vertically between the perforated first skin and the second skin.

The core may also include a honeycomb core structure that forms the chambers between the perforated first skin and the second skin. The first constriction may be attached to the honeycomb core structure.

The chambers may also include a second chamber. The core may also include a second constriction configured to divide the second chamber into a plurality of fluidly coupled sub-chambers. The second constriction may be configured from or otherwise include a shape memory material.

The acoustic panel system may also include a component of a nacelle for an aircraft propulsion system. The component of the nacelle may include the perforated first skin, the second skin and the core.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
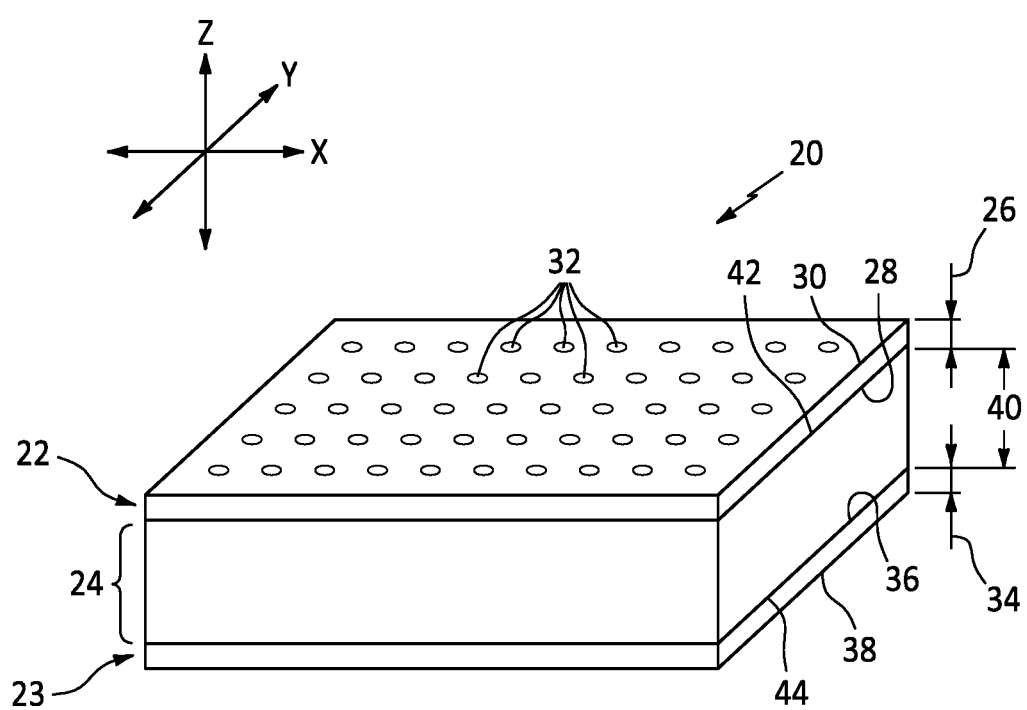
FIG. 1 is a partial perspective schematic illustration of a structural, acoustic panel.
Figure 2A:
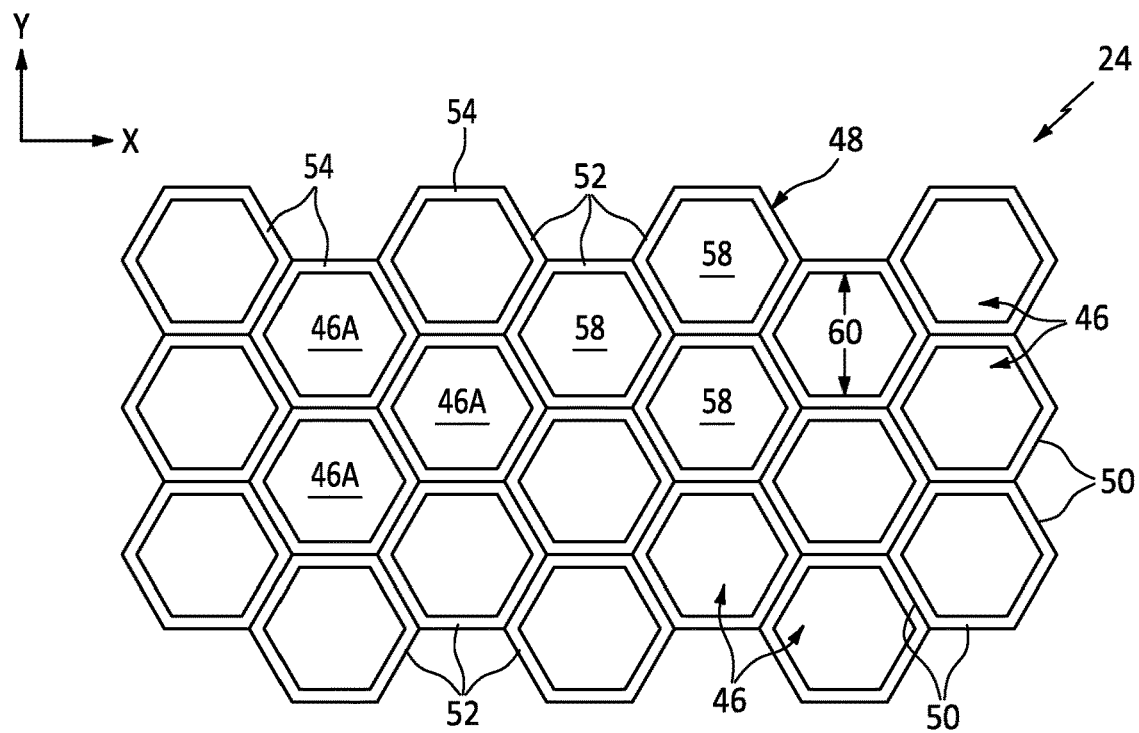
FIG. 2A is a partial illustration of a first side of cellular core with a plurality of constrictions in first configurations.
Figure 2B:
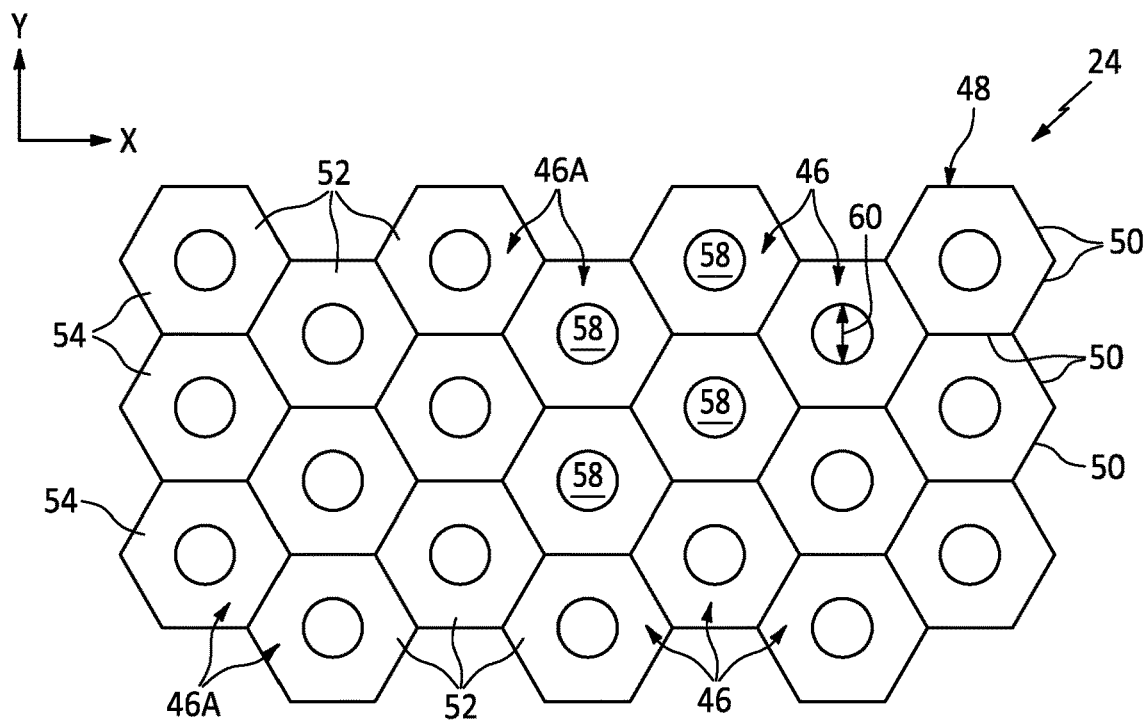
FIG. 2B is a partial illustration of the first side of cellular core with its constrictions in second configurations.

FIG. 1 is a partial perspective schematic illustration of a structural, acoustic panel 20 for attenuating sound; i.e., noise. This acoustic panel 20 may be configured to attenuate sound generated by an aircraft propulsion system such as, for example, a turbofan propulsion system or a turbojet propulsion system. With such a configuration, the acoustic panel 20 may be configured with a nacelle of the propulsion system. The acoustic panel 20, for example, may be configured as or otherwise included as part of an inner or outer barrel, a translating sleeve, a blocker door, etc. Alternatively, the acoustic panel 20 may be configured with another component/structure of the aircraft such as its fuselage or a wing. Furthermore, the acoustic panel 20 may be configured to also or alternatively attenuate aircraft related sound other than sound generated by the propulsion system. The acoustic panel 20 of the present disclosure, of course, may alternatively be configured for non-aircraft applications.

The acoustic panel 20 extends laterally in a first lateral direction (e.g., an x-axis direction) along an x-axis. The acoustic panel 20 extends laterally in a second lateral direction (e.g., a y-axis direction) along a y-axis. The acoustic panel 20 extends vertically in a vertical direction (e.g., a z-axis direction) along a z-axis. Note, the term "lateral" may be used herein to generally describe the first lateral direction, the second lateral direction and/or any other direction within the x-y plane. Also note, the term "vertical" may be used herein to describe a depthwise panel direction and is not limited to a gravitational up/down direction. Furthermore, for ease of illustration, the x-y plane is shown as a generally flat plane. However, in other embodiments, the x-y plane and, thus, the acoustic panel 20 may be curved and/or follow an undulating and/or otherwise variable geometry. For example, the x-y plane and, thus, the acoustic panel 20 may be arcuate, cylindrical, conical, frustoconical, or tapered with or without radial undulations. In such embodiments, a solely vertical direction (e.g., z-axis direction) is defined relative to a position of interest on the x-y plane. For example, on a spherical x-y plane, the vertical direction (e.g., z-axis) direction is a radial direction.

The acoustic panel 20 includes a perforated first skin 22 (e.g., a face, front and/or exterior skin with one or more through-holes), a solid, non-perforated second skin 23 (e.g., a back and/or interior skin without any through-holes) and a structural cellular core 24. Briefly, the cellular core 24 is arranged and extends vertically between the first skin 22 and the second skin 23. The cellular core 24 is also connected to the first skin 22 and/or the second skin 23. The cellular core 24, for example, may be welded, brazed, fused, adhered or otherwise bonded to the first skin 22 and/or the second skin 23. The cellular core 24 may also and/or alternatively be mechanically fastened to the first skin 22 and/or the second skin 23. Alternatively, the cellular core 24 may be formed integral with the first skin 22 and/or the second skin 23 as a monolithic body using, for example, a molding process or an additive manufacturing process. The present disclosure, of course, is not limited to any particular manufacturing methods.

The first skin 22 may be configured as a relatively thin sheet or layer of material that extends laterally within the x-y plane. This first skin material may include, but is not limited to, metal, polymer (e.g., thermoplastic or thermoset material), a fiber reinforced composite (e.g., fiber reinforcement such as, but not limited to, fiberglass, carbon fiber and/or aramid fibers embedded within a polymer matrix), or a combination thereof. The first skin 22 has a vertical thickness 26. This first skin vertical thickness 26 extends vertically between opposing side surfaces 28 and 30 of the first skin 22. The first skin 22 includes a plurality of perforations 32; e.g., apertures such as through-holes. Each of these first skin perforations 32 extends generally vertically through the first skin 22 between the first skin side surfaces 28 and 30.

The second skin 23 may be configured as a relatively thin sheet or layer of (e.g., continuous and uninterrupted) material that extends laterally within the x-y plane. This second skin material may include, but is not limited to, metal, polymer (e.g., thermoplastic or thermoset material), a fiber reinforced composite (e.g., fiber reinforcement such as, but not limited to, fiberglass, carbon fiber and/or aramid fibers embedded within a polymer matrix), or a combination thereof. The second skin material may be the same as or different than the first skin material. The second skin 23 has a vertical thickness 34. This second skin vertical thickness 34 extends vertically between opposing side surfaces 36 and 38 of the second skin 23. The second skin vertical thickness 34 may be substantially equal to or different (e.g., greater or less) than the first skin vertical thickness 26.

The cellular core 24 extends laterally within the x-y plane. The cellular core 24 has a vertical thickness 40. This core vertical thickness 40 extends vertically between opposing sides 42 and 44 of the cellular core 24, which core sides 42 and 44 are respectively abutted against the first skin interior side surface 28 and the second skin interior side surface 36. The core vertical thickness 40 may be substantially greater than the first skin vertical thickness 26 and/or the second skin vertical thickness 34. The core vertical thickness 40, for example, may be at least ten to forty times (10-40×), or more, greater than the vertical thickness 26, 34; however, the acoustic panel 20 of the present disclosure is not limited to such an exemplary embodiment.

Referring to FIGS. 2A-B and 3A-B, the cellular core 24 is configured to form one or more internal chambers 46 (e.g., acoustic resonance chambers, cavities, etc.) vertically between the first skin 22 and the second skin 23. The cellular core 24 of FIGS. 2A-B and 3A-B, for example, includes a cellular core structure 48. This cellular core structure 48 may be configured as a honeycomb core structure. The cellular core structure 48 of FIG. 4, for example, includes a plurality of corrugated sidewalls 50. These sidewalls 50 are arranged in a side-by-side array and are connected to one another such that each adjacent (e.g., neighboring) pair of the sidewalls 50 forms an array of the chambers 46 laterally therebetween. Of course, in other embodiments, the sidewalls 50 may be formed integral with one another as a cellular grid structure as shown, for example, in FIG. 5. The cellular core structure 48 and its sidewalls 50 are constructed from or otherwise include core material. This core material may include, but is not limited to, metal, polymer (e.g., thermoplastic or thermoset material), a fiber reinforced composite (e.g., fiber reinforcement such as, but not limited to, fiberglass, carbon fiber and/or aramid fibers embedded within a polymer matrix), or a combination thereof.

Figure 3A:
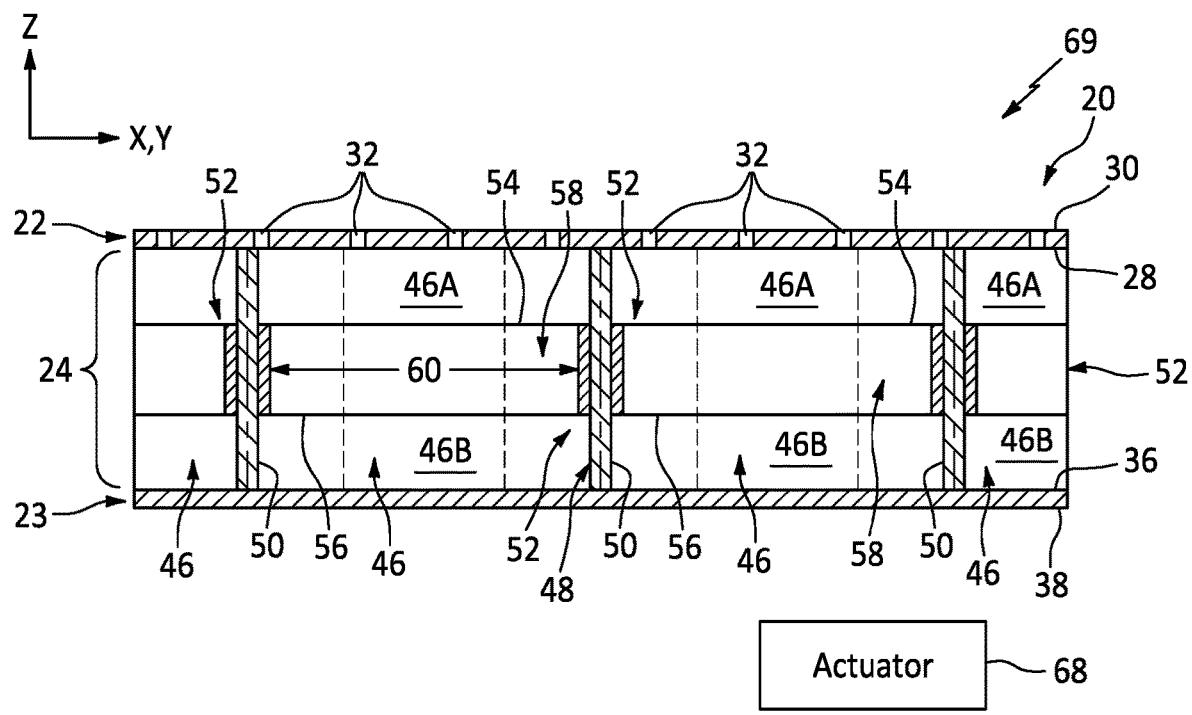
FIG. 3A is a partial sectional illustration of an acoustic panel system with the constrictions of the acoustic panel in the first configurations.
Figure 3B:
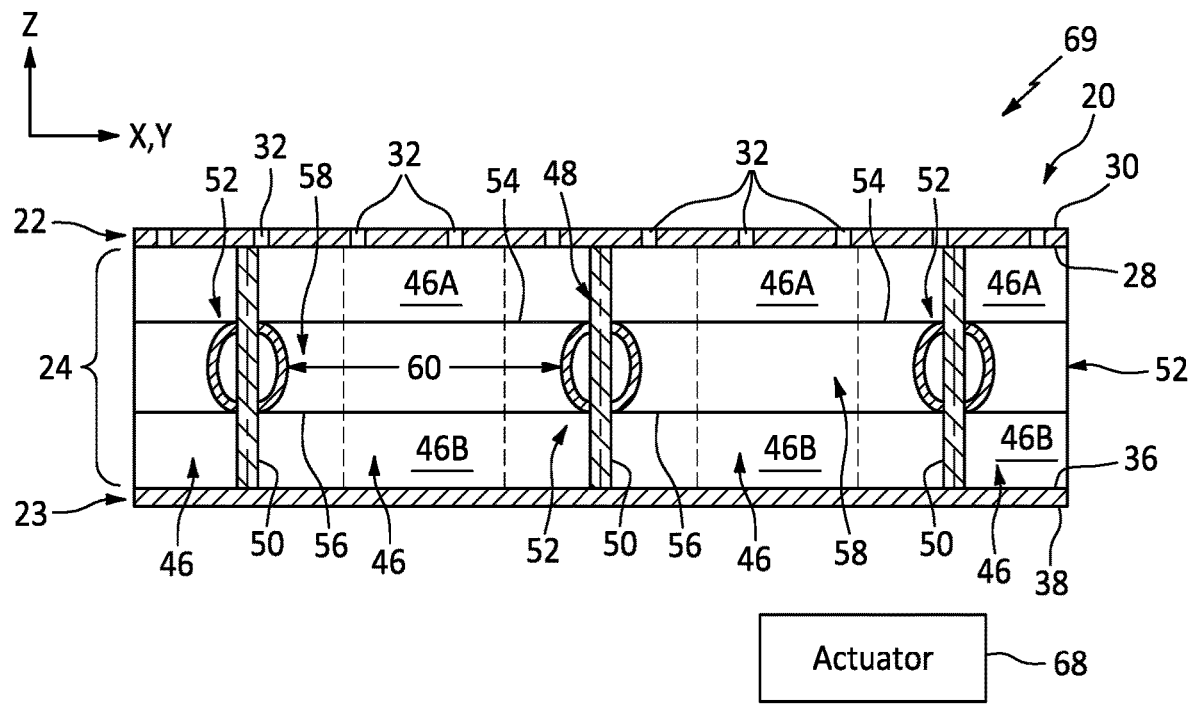
FIG. 3B is a partial sectional illustration of the acoustic panel system with the constrictions of the acoustic panel in the second configurations.
Figure 4:
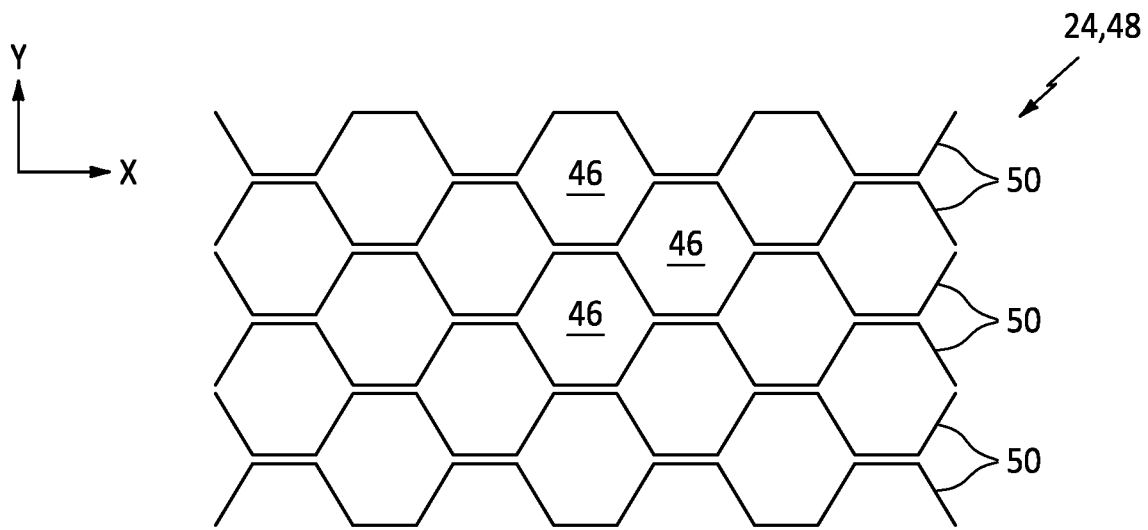
FIG. 4 is a partial schematic illustration of a first side of a cellular core structure.
Figure 5:
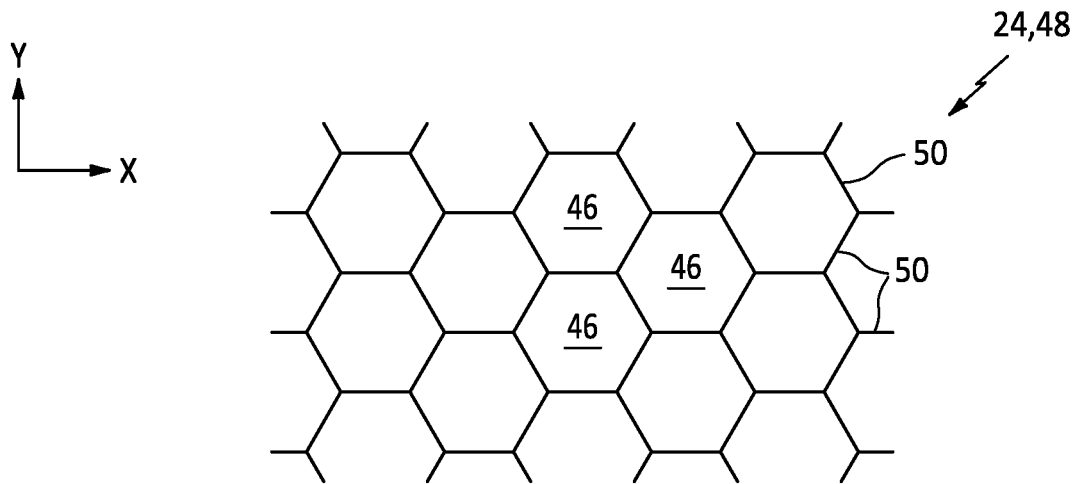
FIG. 5 is a partial schematic illustration of a first side of another cellular core structure.

Referring to FIGS. 3A-B, each of the chambers 46 extends vertically within/through the cellular core 24 to and between the first skin 22 and its interior side surface 28 and the second skin 23 and its interior side surface 36. Referring to FIG. 4, one or more or all of the chambers 46 may each have a polygonal (e.g., hexagonal) cross-sectional geometry when viewed, for example, in a (e.g., x-y) plane parallel to one or more of the elements 22-24 (see FIGS. 3A-B); e.g., perpendicular to the z-axis. The present disclosure, however, is not limited to the foregoing exemplary cellular core configuration. For example, one or more or all of the chambers 46 may each have a circular, elliptical or other non-polygonal cross-sectional geometry. Furthermore, various other types of honeycomb cores and, more generally, various other types of cellular cores for an acoustic panel are known in the art, and the present disclosure is not limited to any particular ones thereof.

Referring to FIGS. 2A-B and 3A-B, the cellular core 24 also includes one or more reconfigurable (e.g., deformable) chamber constrictions 52; e.g., flow constrictions. Each of these constrictions 52 may be arranged with a respective one of the chambers 46. More particularly, each of the constrictions 52 may be disposed within a respective one of the chambers 46.

Referring to FIGS. 3A and 3B, each of the constrictions 52 may fluidly divide/separate a respective one of the chambers 46 into a plurality of sub-chambers 46A and 46B. Each constriction 52 of FIGS. 3A-B, for example, forms a septum that extends laterally (e.g., in both the x-axis and the y-axis directions) across the respective chamber 46. With this arrangement, the first sub-chamber 46A is disposed vertically between the first skin 22 and the respective constriction 52 and fluidly coupled with one or more of the first skin perforations 32. The first sub-chamber 46A, for example, extends vertically between and to the first skin interior side surface 28 and a first end 54 of the respective constriction 52. This first sub-chamber 46A also extends laterally (e.g., in both the x-axis and the y-axis directions) between and to the opposing sidewalls 50 of the respective chamber 46. The second sub-chamber 46B is disposed vertically between the second skin 23 and the respective constriction 52. The second sub-chamber 46B, for example, extends vertically between and to the second skin interior side surface 36 and a second end 56 of the respective constriction 52, which constriction second end 56 is vertically opposite the constriction first end 54. This second sub-chamber 46B also extends laterally (e.g., in both the x-axis and the y-axis directions) between and to the opposing sidewalls 50 of the respective chamber 46.

Each constriction 52 of FIGS. 2A-B and 3A-B is configured with at least one variable constriction aperture 58; e.g., a through hole. This aperture 58 of FIGS. 3A and 3B extends vertically through the respective constriction 52 between and to the constriction first end 54 and the constriction second end 56. The aperture 58 thereby fluidly couples the respective first sub-chamber 46A with the respective second sub-chamber 46B.

One or more or all of the constrictions 52 are configured with a variable geometry/have a variable configuration. Each constriction 52 in FIGS. 2A-B and 3A-B, for example, is moveable, positionable, bendable, deformable or otherwise reconfigurable between a first configuration (e.g., see FIGS. 2A and 3A) and a second configuration (e.g., see FIGS. 2B and 3B). In the first configuration of FIGS. 2A and 3A, a size 60 (e.g., a lateral width, diameter, etc.) of the aperture 58 in the respective constriction 52 has a first value. In the second configuration of FIGS. 2B and 3B, the aperture size 60 has a second value that is different (e.g., less) than the first value. Each constriction 52 may thereby be configured to alter (e.g., reduce) the size 60 of its aperture 58 (e.g., further constrict flow through the aperture 58) as that constriction 52 deforms from the first configuration to the second configuration. Each constriction 52 may also change a size 60 (e.g., area) and/or relative vertical position of its reflective surface area on its first end 54 and/or it second end 56.

Figure 6:
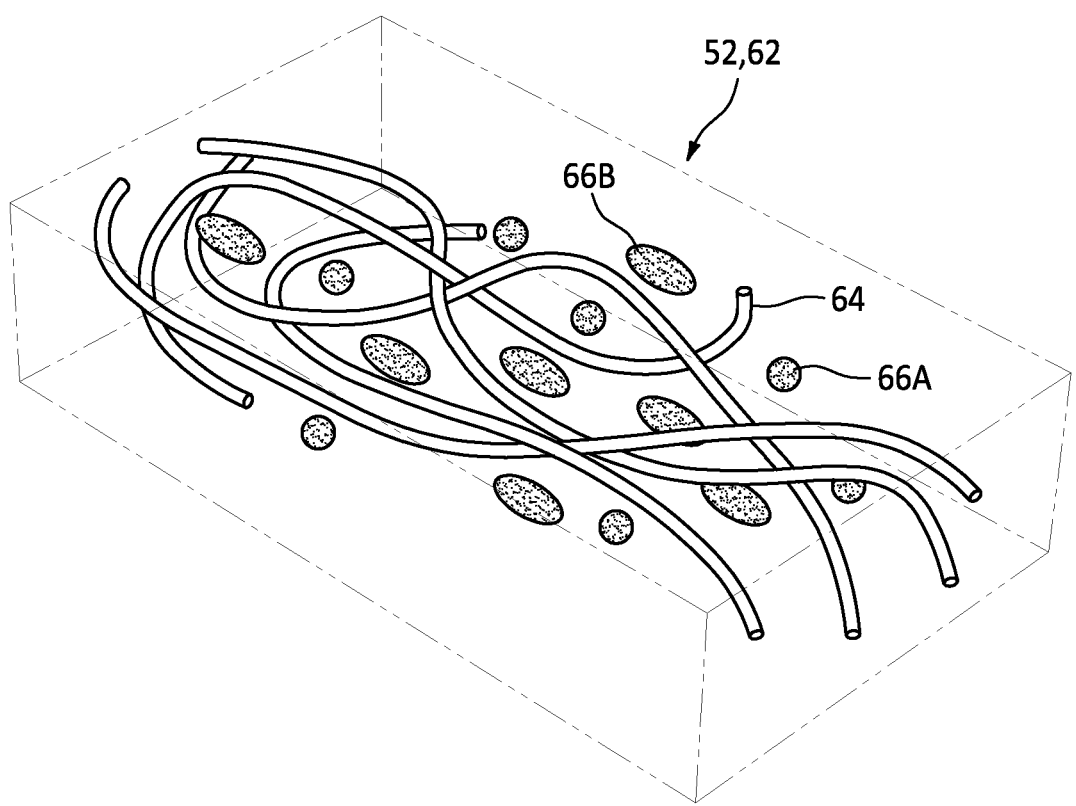
FIG. 6 is a schematic illustration of a portion of shape memory material.

Referring to FIG. 6, one or more or all of the constrictions 52 may be constructed form or otherwise include a shape memory material (SMM) 62. This shape memory material 62 may be configured to selectively deform when subjected to an input such as, but not limited to, a magnetic field. The shape memory material 62 of FIG. 6, for example, includes a (e.g., amorphous) shape memory polymer (SMP) 64 and one or more magnetic particles 66A and 66B (generally referred to as "66"). Examples of the shape memory polymer 64 include, but are not limited to, an acrylate-based amorphous polymer. The magnetic particles 66 may be particles of magnetic material such as, but not limited to, NdFeB and $Fe_3O_4$. For example, the first magnetic particles 66A may be particles of NdFeB, and the second magnetic particles 66B may be particles of $Fe_3O_4$. The present disclosure, however, is not limited to the foregoing exemplary shape memory material or components thereof.

Figure 7C:
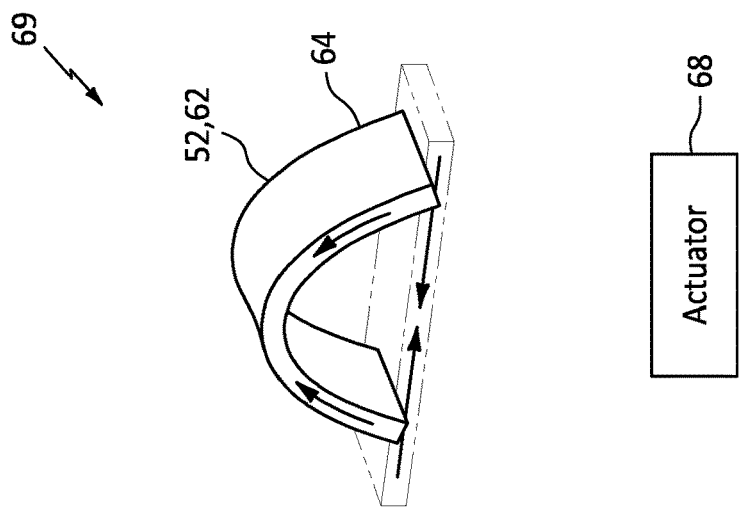
FIGS. 7A-C are schematic illustrations of the shape memory material being deformed by an unput from an actuator of the acoustic panel system.
Figure 7B:
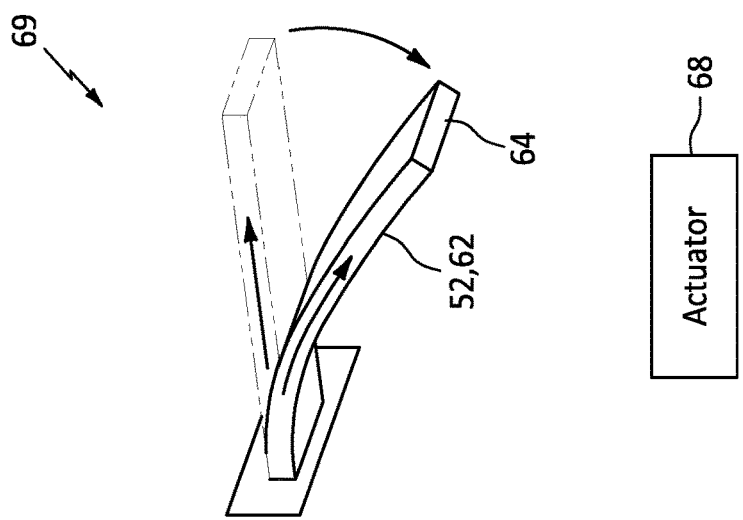
Figure 7A:
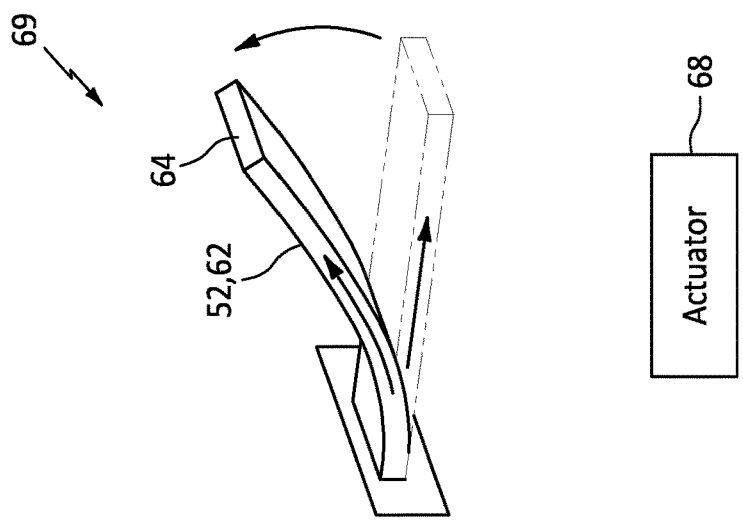

Referring to FIGS. 7A and 7B, the shape memory material 62 and, thus, the respective constriction 52 may be actuated remotely (e.g., wirelessly) via an actuator 68 such as, but not limited to, an electromagnet of an acoustic panel system 69. This actuator 68 may generate and transmit an input such as a magnetic field. Subjecting the shape memory material 62 to this input may cause the shape memory material 62 to deform in a predetermined manner. For example, a first magnetic field (e.g., a positive magnetic field) may be output by the actuator 68 of FIG. 7A. This first magnetic field may cause the shape memory material 62 and, thus, the respective constriction 52 to deform in a first direction; e.g., curve upwards in FIG. 7A. In another example, a second magnetic field (e.g., a negative magnetic field) opposite the first magnetic field may be output by the actuator 68 of FIG. 7B. This second magnetic field may cause the shape memory material 62 and, thus, the respective constriction 52 to deform in a second direction that is opposite the first direction; e.g., curve downward in FIG. 7B.

During deformation, the magnetic field may excite one or more of the magnetic particles 66 within the shape memory material 62 of FIG. 6. This excitement may generate heat which softens the shape memory polymer 64. The magnetic field may also exert a force on one or more of the magnetic particles 66. This force may push or pull the one or more of the magnetic particles 66 in a certain predetermined direction (e.g., see FIGS. 7A-C). Note, the magnetic particles 66 may be oriented (e.g., with common or different particle orientations) within the shape memory polymer 64 to move in different directions in order to deform the respective constriction 52 in a particular manner; e.g., see FIG. 7C. Once the magnetic field is turned off, the shape memory polymer 64 may rapidly cool and harden thereby holding the deformed shape of the respective constriction 52.

Referring to FIGS. 3A and 3B, during operation, the chambers 46 operate as resonance chambers for attenuating sound. Sound waves, for example, may enter each of the chambers 46 through the respective first skin perforation(s) 32. Some of these sound waves (first sound waves) may travel through the respective first sub-chamber 46A to the respective constriction 52 and the surface at its first end 54. This constriction 52 may reflect the first sound waves back through the respective first sub-chamber 46A to the respective first skin perforation(s) 32. Others of the sound waves (second sound waves) may travel through the respective aperture 58 and into the respective second sub-chamber 46B to the second skin 23 and its interior surface 36. The second skin 23 may reflect some of these second sound waves back through the respective second sub-chamber 46B, the respective aperture 58 and the respective first sub-chamber 46A to the respective first skin perforation(s) 32. Some others of the second sound waves may bounce around (e.g., reflect multiple times) within the second sub-chamber 46B before exiting through the respective aperture 58. With such an arrangement, each respective chamber may reverse phase of the sound waves of multiple different frequencies using known acoustic reflection principles and subsequently direct the reverse phase sound waves out of the acoustic panel 20 through the respective first skin perforation(s) 32 to destructively interfere with other incoming sound waves. The acoustic panel 20 may thereby attenuate noise. The constriction 52 may thereby function as a septum to facilitate attenuating multiple sound frequencies.

The sound attenuation may be tuned/varied during operation using the actuator 68; e.g., the electromagnet. For example, when the actuator 68 outputs a first input (e.g., a first magnetic field), the constrictions 52 may deform to their first configuration of FIG. 3A. In this first configuration, the apertures 58 are relatively large. Then, the system may behave as a regular honeycomb liner, with resonances pre-determined by the core depth (or panel thickness). However, when the actuator 68 outputs a second input (e.g., a second magnetic field, which may be opposite and/or of a different magnitude than the first magnetic field), the constrictions 52 may deform to their second configuration of FIG. 3B. In this second configuration, the apertures 58 are relatively small. Thus, the constrictions 52 interfere with the simple one-dimensional (1D) sound propagation, generating mass-like phase shifts on the dynamics of the cell, leading to modified resonant frequencies. The constrictions 52 may create a shift towards lower frequencies. Depending on the vertical locations of the constrictions 52, the shift may occur on some of the first, second, third or higher resonances (or anti-resonances), but typically not all of them for a given vertical location. In this manner, the constrictions 52 may be reconfigured (e.g., deformed) to attenuate different frequency bands during operation.

The constrictions 52 of the present disclosure may have various configurations and may be arranged at various locations within the chambers 46. Examples of such configurations and locations are described below with reference to FIGS. 8A-B, 9A-B and 10A-B. The present disclosure, however, is not limited to such exemplary constriction configurations or locations.

Figure 8A:
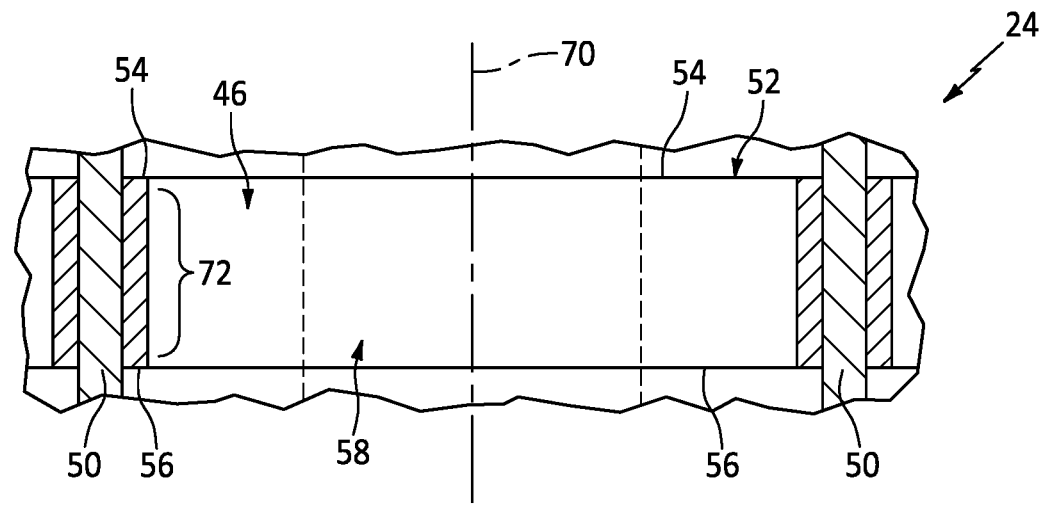
FIGS. 8A and 8B are partial illustrations of the cellular core with its constrictions deforming from first configurations to second configurations.
Figure 8B:
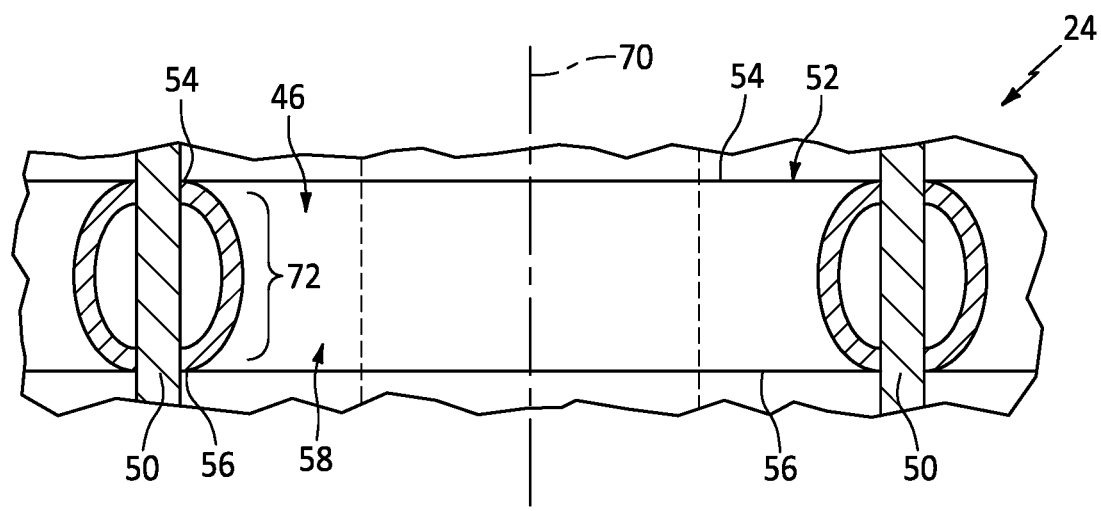

Referring to FIGS. 8A-B, each constriction 52 may extend longitudinally (e.g., vertically) along a longitudinal centerline 70 of the respective chamber 46 between and to the first end 54 of the constriction 52 and the second end 56 of the constriction 52. Each constriction 52 may also extend circumferentially about (e.g., completely around, or partially around) the longitudinal centerline 70 thereby providing the respective constriction 52 with, for example, an annular or tubular body. The constriction first end 54 (e.g., an annular edge) and the constriction second end 56 (e.g., an annular edge) of FIGS. 8A-B are located next to and fixedly attached (e.g., bonded) to the chamber sidewall(s) 50. An intermediate portion 72 of the constriction 52, which is vertically between the constriction first end 54 and the constriction second end 56, is displaceable from (e.g., not attached to) the chamber sidewall(s) 50. With this arrangement, when excited by the actuator input (e.g., the magnetic field), the intermediate portion 72 of the respective constriction 52 may move laterally (e.g., radially inwards relative to the longitudinal centerline 70) away from the chamber sidewall (s) 50 and thereby change (e.g., reduce) the size 60 (see FIGS. 3A and 3B) of the respective aperture 58. In the configuration of FIG. 8A, each constriction 52 may have a (e.g., approximately or exactly) tubular shape. In the configuration of FIG. 8B, each constriction 52 may have a partial (e.g., half) torus shape. More particularly, a sectional geometry of the respective constriction 52 is outwardly concave and (e.g., about) semi-circular when viewed, for example, in a plane coincident with and/or parallel with the longitudinal centerline 70. Here, an apex of the intermediate portion 72 of the respective constriction 52 forms a metering portion (e.g., a minimum lateral dimension) of the aperture 58.

Figure 9A:
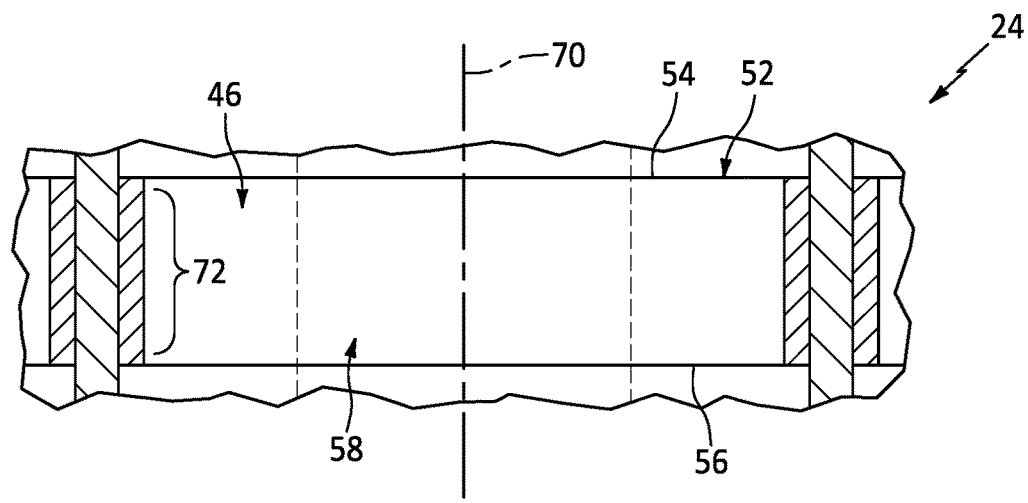
FIGS. 9A and 9B are partial illustrations of the cellular core with alternative constrictions deforming from first configurations to second configurations.
Figure 9B:
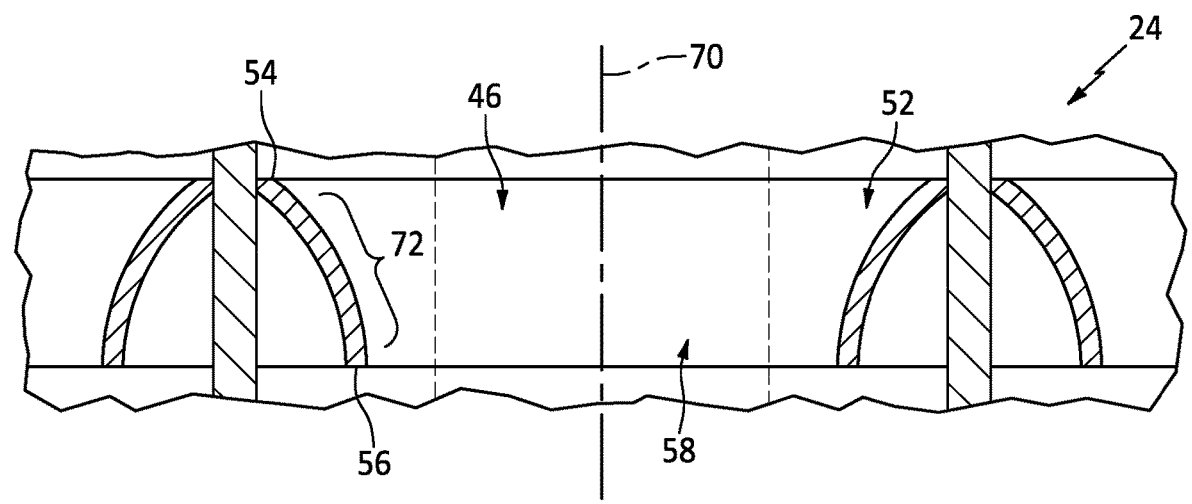

Both the constriction first and second ends 54 and 56 may be attached to the chamber sidewall(s) 50 as described above. Alternatively, referring to FIGS. 9A-B, one of the constriction ends 54, 56 may be displaceable from the chamber sidewall(s) 50. The constriction second end 56 of FIGS. 9A-B, for example, is not attached to the chamber sidewall(s) 50. With this arrangement, when excited by the actuator input (e.g., the magnetic field), the constriction second end 56 as well as the intermediate portion 72 of the respective constriction 52 may move laterally (e.g., radially inwards relative to the longitudinal centerline 70) away from the chamber sidewall(s) 50 and thereby change (e.g., reduce) the size 60 (see FIGS. 3A and 3B) of the respective aperture 58. In the configuration of FIG. 9A, each constriction 52 may have a (e.g., approximately or exactly) tubular shape. In the configuration of FIG. 9B, each constriction 52 may have a partial (e.g., quarter) torus shape. More particularly, a sectional geometry of the respective constriction 52 is outwardly concave and (e.g., about) quarter-circular when viewed, for example, in a plane coincident with and/or parallel with the longitudinal centerline 70. Here, the second end 56 of the respective constriction 52 forms a metering portion (e.g., a minimum lateral dimension) of the aperture 58.

Figure 10A:
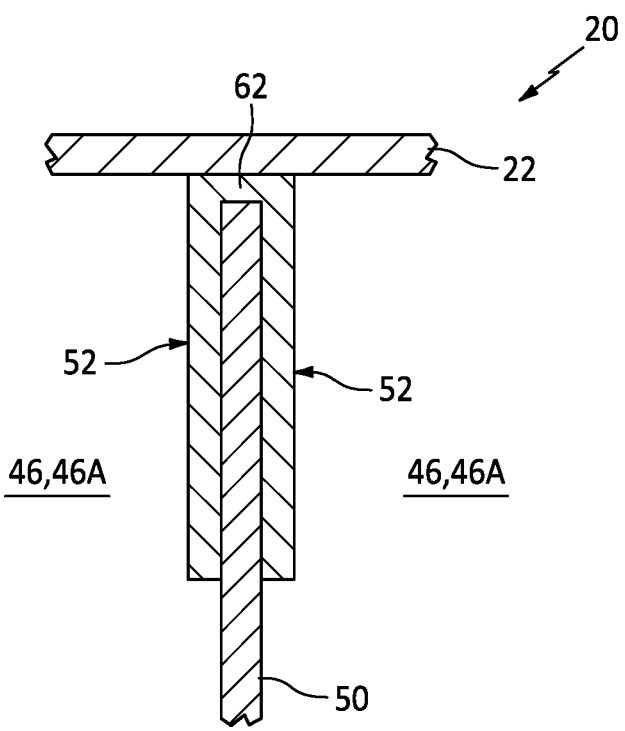
FIGS. 10A and 10B are partial illustrations of the cellular core with its constrictions arranged at different locations along a chamber sidewall.
Figure 10B:
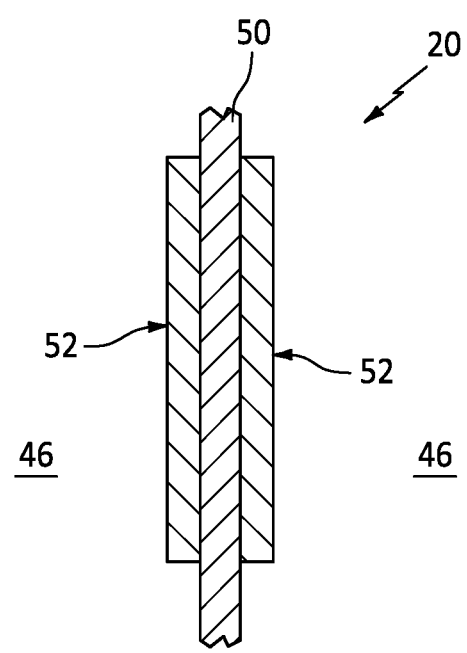

Referring to FIG. 10A-B, each constriction 52 is disposed within a respective chamber 46. For example, referring to FIG. 10A, the constriction 52 may be arranged at (e.g., on, adjacent or proximate) one of the ends of the respective chamber 46. The constriction 52 of FIG. 10A, for example, is disposed at a first end of the respective chamber 46 adjacent the first skin 22. Of course, any one or more of the constrictions 52 may also or alternatively be disposed at an opposite second end of the respective chamber 46 adjacent the second skin 23 (see FIGS. 3A and 3B); e.g., the reverse of what is shown in FIG. 10A along the chamber sidewall 50. In another example, referring to FIG. 10B, the constriction 52 may be arranged longitudinally along an intermediate portion of the respective chamber 46 vertically between the chamber first end and the chamber second end.

In some embodiments, referring to FIGS. 3A and 3B, the cellular core structure 48 may be connected directly to the first skin 22 and the second skin 23. In other embodiments, referring to FIG. 10A, the cellular core structure 48 may be connected indirectly to one of the skins 22, 23. The chamber sidewalls 50 of FIG. 10A, for example, are connected indirectly to the first skin 22 through the shape memory material 62. The shape memory material 62, for example, may be draped over ends of the chamber sidewalls 50 during assembly of the acoustic panel 20.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An acoustic panel system, comprising:
   a perforated first skin;
   a second skin; and
   a core connected to the perforated first skin and the second skin, the core including a plurality of chambers and a first constriction;
   each of the plurality of chambers extending vertically through the core between the perforated first skin and the second skin, and the plurality of chambers comprising a first chamber;
   the first constriction configured to divide the first chamber into a plurality of fluidly coupled sub-chambers, and the first constriction comprising a shape memory material; and
   an actuator configured to actuate deformation of the first constriction;
   wherein the first constriction includes and extends vertically between a first end and a second end;
   wherein the first end is attached to a sidewall of the first chamber; and
   wherein an intermediate portion of the first constriction, vertically between the first end and the second end, is not attached to the sidewall of the first chamber such that the intermediate portion of the first constriction is configured to move laterally away from the sidewall of the first chamber when actuated by the actuator.

2. The acoustic panel system of claim 1, wherein the shape memory material comprises a shape memory polymer.

3. The acoustic panel system of claim 2, wherein the shape memory material further comprises a plurality of magnetic particles embedded within the shape memory polymer.

4. The acoustic panel system of claim 1, wherein the shape memory material is a magnetically actuated shape memory material.

5. The acoustic panel system of claim 1, wherein the actuator comprises an electromagnet.

6. The acoustic panel system of claim 1, wherein
   the first constriction is configured to deform from a first configuration to a second configuration in response to being subject to a first input;
   the intermediate portion is abutted against the sidewall of the first chamber when the first constriction is in the first configuration; and
   the intermediate portion is laterally spaced from the sidewall of the first chamber when the first constriction is in the second configuration.

7. The acoustic panel system of claim 6, wherein the first constriction is configured to deform from the second configuration to the first configuration in response to being subject to a second input.

8. The acoustic panel system of claim 1, wherein the first constriction forms an aperture that fluidly couples the plurality of fluidly coupled sub-chambers together.

9. The acoustic panel system of claim 8, wherein
   the first constriction is configured to deform between a first configuration and a second configuration; and
   a size of the aperture when the first constriction is in the first configuration is different than the size of the aperture when the first constriction is in the second configuration.

10. The acoustic panel system of claim 1, wherein the second end is attached to the sidewall of the first chamber and is configured to remain attached to the sidewall of the first chamber when the first constriction is actuated by the actuator.

11. The acoustic panel system of claim 1, wherein the second end is not attached to the sidewall of the first chamber such that the second end is configured to move laterally away from the sidewall of the first chamber when actuated by the actuator.

12. The acoustic panel system of claim 1, wherein the first constriction is arranged at a vertical first end of the first chamber and is spaced vertically from a vertical second end of the first chamber.

13. The acoustic panel system of claim 1, wherein the first constriction is arranged intermediately vertically between and spaced vertically from the perforated first skin and the second skin.

14. The acoustic panel system of claim 1, wherein
   the core further comprises a honeycomb core structure that forms the plurality of chambers between the perforated first skin and the second skin; and
   the first constriction is attached to the honeycomb core structure.

15. The acoustic panel system of claim 1, wherein
   the plurality of chambers further comprise a second chamber; and
   the core further comprises a second constriction configured to divide the second chamber into a plurality of fluidly coupled sub-chambers, and the second constriction comprises a shape memory material.

16. The acoustic panel system of claim 1, further comprising a component of a nacelle for an aircraft propulsion system, the component of the nacelle including the perforated first skin, the second skin and the core.

17. An acoustic panel system, comprising:
    a perforated first skin;
    a second skin; and
    a core connected to the perforated first skin and the second skin, the core including a plurality of chambers and a first constriction;

each of the plurality of chambers extending vertically through the core to the perforated first skin and the second skin, and the plurality of chambers comprising a first chamber;

the first constriction dividing the first chamber into a first sub-chamber and a second sub-chamber, the first constriction comprising an aperture that fluidly couples the first sub-chamber to the second sub-chamber, and the first constriction actuatable between a first configuration and a second configuration, wherein a size of the aperture when the first constriction is in the first configuration is different than the size of the aperture when the first constriction is in the second configuration; and an actuator configured to actuate deformation of the first constriction;

wherein the first constriction includes and extends vertically between a first end and a second end;

wherein the first end is attached to a sidewall of the first chamber; and wherein the second end is not attached to the sidewall of the first chamber such that the second end is configured to move laterally away from the sidewall of the first chamber when the first constriction is actuated by the actuator.

18. The acoustic panel system of claim 17, wherein the first constriction comprises a shape memory material configured to deform between the first configuration and the second configuration when subject to an input.

19. An acoustic panel system, comprising:

a perforated first skin;

a second skin; and a core connected to the perforated first skin and the second skin, the core including a plurality of chambers and a first constriction;

each of the plurality of chambers extending vertically through the core to the perforated first skin and the second skin, and the plurality of chambers comprising a first chamber; and the first constriction configured to divide the first chamber into a plurality of fluidly coupled sub-chambers, and the first constriction further configured to deform when subject to a magnetic field;

a first portion of the first constriction abutted against and attached to a sidewall of the first chamber before and during deformation of the first construction; and a second portion of the first constriction abutted against and detached from the sidewall of the first chamber before and during deformation of the first construction.

* * * * *